(12) United States Patent
Lu et al.

(10) Patent No.: US 11,433,630 B2
(45) Date of Patent: Sep. 6, 2022

(54) METHOD FOR MAKING SILICONE HYDROGEL CONTACT LENSES

(71) Applicant: Alcon Inc., Fribourg (CH)

(72) Inventors: Honghui Lu, Johns Creek, GA (US); Mark Neely, Alpharetta, GA (US); Alice Weimin Liu, Alpharetta, GA (US); Xuxian Niu, San Ramon, CA (US); Uwe Haken, Norcross, GA (US)

(73) Assignee: Alcon Inc., Fribourg (CH)

( * ) Notice: Subject to any disclaimer, the term of this patent is extended or adjusted under 35 U.S.C. 154(b) by 162 days.

(21) Appl. No.: 16/709,119

(22) Filed: Dec. 10, 2019

(65) Prior Publication Data

US 2020/0189216 A1 Jun. 18, 2020

Related U.S. Application Data

(60) Provisional application No. 62/779,706, filed on Dec. 14, 2018.

(51) Int. Cl.
*B29D 11/00* (2006.01)
*G02B 1/04* (2006.01)
*B29K 83/00* (2006.01)
*B29K 105/00* (2006.01)

(52) U.S. Cl.
CPC .... B29D 11/0025 (2013.01); B29D 11/00134 (2013.01); G02B 1/043 (2013.01); *B29K 2083/00* (2013.01); *B29K 2105/0061* (2013.01)

(58) Field of Classification Search
CPC .......... B29D 11/0025; B29D 11/00134; G02B 1/043
See application file for complete search history.

(56) References Cited

U.S. PATENT DOCUMENTS

| | | | |
|---|---|---|---|
| 6,039,913 A | 3/2000 | Hirt et al. | |
| 7,091,283 B2 | 8/2006 | Mueller et al. | |
| 7,238,750 B2 | 7/2007 | Mueller et al. | |
| 7,268,189 B2 | 9/2007 | Mueller et al. | |
| 7,521,519 B1 | 4/2009 | Hirt et al. | |
| 8,003,710 B2 | 8/2011 | Medina et al. | |
| 8,071,658 B2 | 12/2011 | Zhou et al. | |
| 8,071,703 B2 | 12/2011 | Zhou et al. | |
| 8,383,744 B2 | 2/2013 | Justynska | |
| 8,404,783 B2 | 3/2013 | Chang et al. | |
| 8,524,800 B2 | 9/2013 | Phelan | |
| 8,642,712 B2 | 2/2014 | Chang | |
| 9,108,368 B2 * | 8/2015 | Biel | B05C 3/10 |
| 9,250,357 B2 * | 2/2016 | Mahadevan | G02B 1/043 |
| 2008/0103288 A1 | 5/2008 | Brame | |
| 2008/0143958 A1 | 6/2008 | Medina | |
| 2008/0257389 A1 * | 10/2008 | Daulton | B29D 11/00067 134/88 |

FOREIGN PATENT DOCUMENTS

EP 2969498 B1 4/2017

* cited by examiner

*Primary Examiner* — Mathieu D Vargot

(74) *Attorney, Agent, or Firm* — Sheng-Hsin Hu

(57) ABSTRACT

The present invention generally relates to a method for producing silicone hydrogel contact lenses having less optical defects or free of optical defects by subjecting the extraction tray for the formed silicone hydrogel contact lenses to a reciprocating lowering and raising motion thereof to obtain the silicone hydrogel contact lenses.

7 Claims, 2 Drawing Sheets

METHOD FOR MAKING SILICONE HYDROGEL CONTACT LENSES

This application claims the benefit under 35 USC § 119(e) of U.S. provisional application No. 62/779,706, filed on 14 Dec. 2018, incorporated by reference in its entirety.

The present invention generally relates to a method for producing contact lenses with less optical defect or free of optical defect.

BACKGROUND

A great effort has been made to develop technologies for cast molding of hydrogel contact lenses with high precision, fidelity and reproducibility and at low cost. In addition, a great effort has also been made to develop new hydrogel contact lenses products with new formulations comprising new monomers or macromers. Typically, new products are manually made in the laboratory for an initial small scale evaluation. Some promising products may be selected for further developed through trials on machines for a larger scale evaluation. However, trials on manufacturing machines are very expensive and produce too many trial products for the purpose of development evaluation. A continuous pilot machine would be an optimum choice for the new product development. A double-sided molding (DSM) process has become a common process for making contact lenses. This process typically involves dispensing of a liquid lens forming material into a female mold half, mating a male mold half to the female, and then applying thermal energy or ultraviolet radiation to polymerize the lens forming material. The polymerized lens removed from the molds in a DSM process does not usually require surface polishing, but subsequent extraction of unreacted monomer or solvent is commonly required. The extraction process typically involves several stages of extraction with changing concentrations of a solvent or solvent mixture. These several stages of extraction typically require quite a large amount of financial resources and space to accommodate them.

Therefore, there is still a need for new extraction process that can be designed for a pilot plant using a relatively small space while producing trial products for product development evaluation.

SUMMARY OF THE INVENTION

The invention provides a method for producing silicone hydrogel contact lenses with significantly reduced optical defect comprising the steps of:

(1) introducing a polymerizable lens-forming material into a lens mold, wherein the lens-forming material is a silicone hydrogel lens-forming material, (2) curing thermally or actinically the polymerizable lens-forming material in the lens mold to form a silicone hydrogel contact lens;

(3) extracting the formed silicone hydrogel contact lenses which are hold in extraction trays by at least two extracting stages in a single process tank, Wherein the extracting step comprises the following steps:

a) extracting the formed silicone hydrogel contact lenses with a first extracting medium, wherein the first extracting medium is a first solvent or a mixture of the first solvent and water, b) draining the first extracting medium out of the process tank, c) refilling the process tank with a 100% water, wherein during refilling the process tank, subjecting the extraction tray for the formed silicone hydrogel contact lenses to a reciprocating lowering and raising motion thereof to obtain the silicone hydrogel contact lenses, wherein the silicone hydrogel contact lenses have significantly reduced tray marks and/or dimples observed using a Contact Lens Optical Quality Analyzer, relative to control silicone hydrogel contact lenses obtained by the same processes except of eliminating the reciprocating lowering and raising motion in step c).

These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be effected without departing from the spirit and scope of the novel concepts of the disclosure.

DETAILED DESCRIPTION OF EMBODIMENTS OF THE INVENTION

Figure 1:
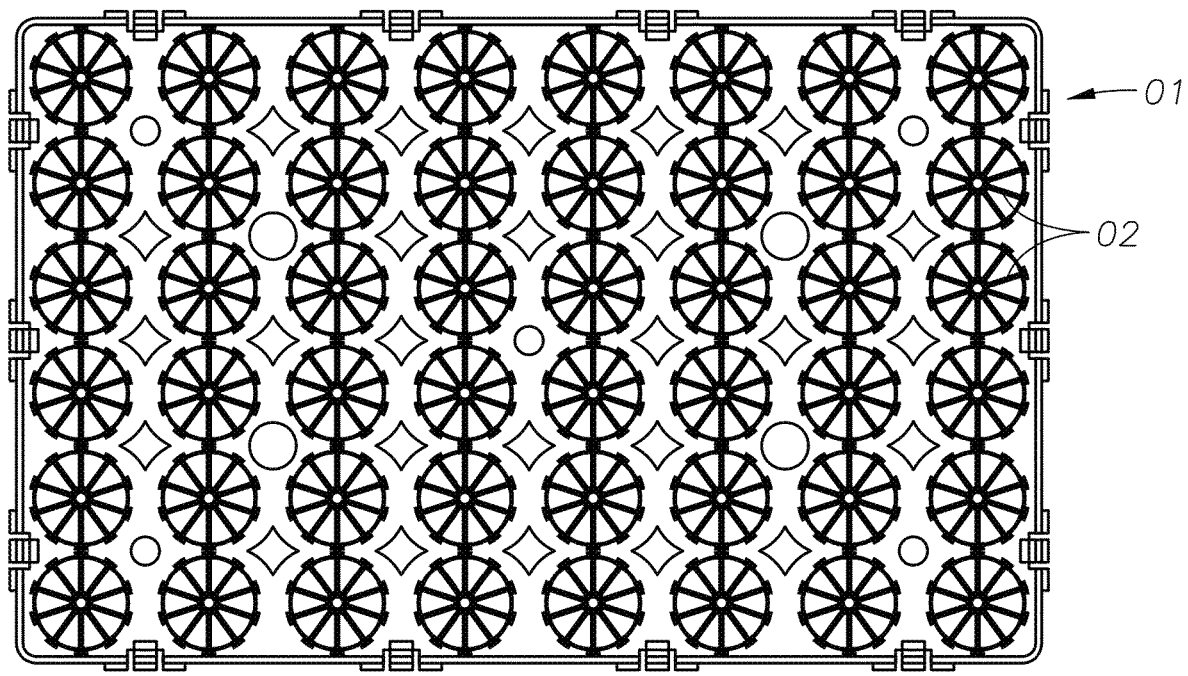
FIG. 1 illustrates an extraction tray plate according to the present invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art.

A "hydrogel" or "hydrogel material" refers to a polymeric material which can absorb at least 10 percent by weight of water when it is fully hydrated.

A "silicone hydrogel" refers to a silicone-containing hydrogel obtained by copolymerization of a polymerizable composition comprising at least one silicone-containing monomer or at least one silicone-containing macromer or at least one crosslinkable silicone-containing prepolymer.

"Hydrophilic," as used herein, describes a material or portion thereof that will more readily associate with water than with lipids.

A "monomer" means a low molecular weight compound that can be polymerized and comprises one or more actinically crosslinkable groups. Low molecular weight typically means average molecular weights less than 700 Daltons.

An "actinically-crosslinkable group" refers to a group which can react with another group of same type or different type to form a covalent linkage upon actinic irradiation. Examples of actinically-crosslinkable groups include without limitation acryl groups

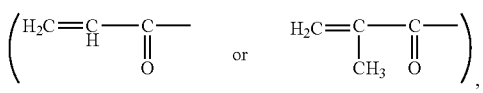

thiol groups, and ene-containing groups. Acryl groups can undergo free-radical chain reaction upon actinic irradiation. Thiol groups (—SH) and ene-containing groups can participate in thiol-ene step-growth radical polymerization as described in a commonly-owned copending US patent application publication No. 2008/0143958 A1, herein incorporated in reference in its entirety.

A "ene-containing group" is a mono-valent or divalent radical contains a carbon-carbon double which is not directly linked to a carbonyl group (—CO—), nitrogen atom, or oxygen atom.

A "vinylic monomer", as used herein, refers to a monomer that has an ethylenically unsaturated group and can be polymerized actinically or thermally.

The term "olefinically unsaturated group" or "ethylentically unsaturated group" is employed herein in a broad sense and is intended to encompass any groups containing a >C=C<group. Exemplary ethylenically unsaturated groups include without limitation acryloyl, methacryloyl, allyl, vinyl, styrenyl, or other C=C containing groups.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV irradiation, ionized radiation (e.g. gamma ray or X-ray irradiation), microwave irradiation, and the like. Thermal curing or actinic curing methods are well-known to a person skilled in the art.

A "hydrophilic monomer" refers to a monomer which can be polymerized to form a polymer that is water-soluble or can absorb at least 10 percent by weight of water.

A "hydrophobic monomer", as used herein, refers to a monomer which is polymerized to form a polymer that is insoluble in water and can absorb less than 10 percent by weight water.

A "macromer" refers to a medium and high molecular weight compound which can be polymerized and/or crosslinked and comprise one or more actinically-crosslinkable groups. Medium and high molecular weight typically means average molecular weights greater than 700 Daltons.

A "prepolymer" refers to a starting polymer which contains actinically crosslinkable groups and can be cured (e.g., crosslinked) actinically to obtain a crosslinked polymer having a molecular weight much higher than the starting polymer.

A "silicone-containing prepolymer" refers to a prepolymer which contains silicone and can be crosslinked actinically to obtain a crosslinked polymer having a molecular weight much higher than the starting polymer.

"Molecular weight" of a polymeric material (including monomeric or macromeric materials), as used herein, refers to the number-average molecular weight unless otherwise specifically noted or unless testing conditions indicate otherwise.

"Polymer" means a material formed by polymerizing one or more monomers.

As used herein, the term "multiple" refers to three or more.

A "photoinitiator" refers to a chemical that initiates radical crosslinking/polymerizing reaction by the use of light.

A "thermal initiator" refers to a chemical that initiates radical crosslinking/polymerizing reaction by the use of heat energy.

A "lens-forming material" refers to a fluid material which can be polymerized and/or crosslinked actinically or thermally to form a contact lens. Lens-forming materials are well known to a person skilled in the art.

The term "fluid" as used herein indicates that a material is capable of flowing like a liquid.

The term "optical defect" as used herein indicates that a contact lens has a tray mark or a dimple (partial tray mark).

"The term "(meth)acrylamide" refers to methacrylamide and/or acrylamide.

The term "(meth)acrylate" refers to methacrylate and/or acrylate.

A "blending vinylic monomer" refers to a vinylic monomer capable of dissolving both hydrophilic and hydrophobic components of a polymerizable composition to form a solution.

A "polysiloxane" refers to a compound containing a polysiloxane segment of

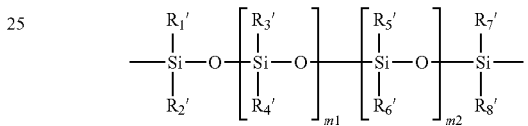

in which m1 and m2 independently of each other are an integer of from 0 to 500 and (m1+m2) is from 2 to 500, $R_1'$, $R_2'$, $R_3'$, $R_4'$, $R_5'$, $R_6'$, $R_7'$, and $R_8'$ independently of one another, are $C_1$-$C_{10}$ alkyl, $C_1$-$C_4$ alkyl- or $C_1$-$C_4$-alkoxy-substituted phenyl, $C_1$-$C_{10}$ fluoroalkyl, $C_1$-$C_{10}$ fluoroether, $C_6$-$C_{18}$ aryl radical, -alk-$(OC_2H_4)_{m3}$—OR (in which alk is $C_1$-$C_6$ alkyl diradical, R' is H or $C_1$-$C_4$ alkyl and m3 is an integer from 1 to 10), or a linear hydrophilic polymer chain.

The term "alkyl" refers to a monovalent radical obtained by removing a hydrogen atom from a linear or branched alkane compound. An alkyl group (radical) forms one bond with one other group in an organic compound.

The term "alkylene divalent group" or "alkylene diradical" or "alkyl diradical" interchangeably refers to a divalent radical obtained by removing one hydrogen atom from an alkyl. An alkylene divalent group forms two bonds with other groups in an organic compound.

The term "alkyl triradical" refers to a trivalent radical obtained by removing two hydrogen atoms from an alkyl. An alkyl triradical forms three bonds with other groups in an organic compound.

The term "alkoxy" or "alkoxyl" refers to a monovalent radical obtained by removing the hydrogen atom from the hydroxyl group of a linear or branched alkyl alcohol. An alkoxy group (radical) forms one bond with one other group in an organic compound.

As used in this application, the term "reactive vinylic monomer" refers to any vinylic monomer having at least one reactive functional group selected from the group consisting of carboxyl group, primary amino group, and secondary amino group.

As used in this application, the term "non-reactive vinylic monomer" refers to any vinylic monomer (either hydrophilic or hydrophobic vinylic monomer) free of carboxyl group, primary amino group, secondary amino group, epoxide group, isocyanate group, azlactone group, or aziridine group.

A free radical initiator can be either a photoinitiator or a thermal initiator. A "photoinitiator" refers to a chemical that initiates free radical crosslinking/polymerizing reaction by the use of light. A "thermal initiator" refers to a chemical that initiates radical crosslinking/polymerizing reaction by the use of heat energy.

The invention is generally related to a method for producing silicone hydrogel contact lenses with significantly reduced optical defect comprising the steps of:

(1) introducing a polymerizable lens-forming material into a lens mold, wherein the lens-forming material is a silicone hydrogel lens-forming material, (2) curing thermally or actinically the polymerizable lens-forming material in the lens mold to form a silicone hydrogel contact lens;

(3) extracting the formed silicone hydrogel contact lenses by at least three extracting stages in a single process tank, Wherein the extracting step comprises the following steps:

a) extracting the formed silicone hydrogel contact lenses with a first extracting medium, wherein the first extracting medium is the 100% first solvent, b) draining the first extracting medium out of the process tank, wherein the formed silicone hydrogel contact lenses are placed in a extraction tray, c) refilling the process tank with a second extracting medium while the extraction tray maintained in the process tank, wherein the second extracting medium is a mixture of second solvent and water, wherein the first solvent and the second solvent can be same or different, d) draining the second extracting medium out of the process tank, e) refilling the process tank with a third extracting medium while the extraction tray maintained in the process tank, wherein the third extracting medium is the 100% water, wherein refilling the process tank, subjecting the extraction tray for the formed silicone hydrogel contact lenses to a reciprocating lowering and raising motion thereof to obtain the silicone hydrogel contact lenses, wherein the silicone hydrogel contact lenses have significantly reduced tray marks and/or dimples observed using a control Contact Lens Optical Quality Analyzer, relative to control silicone hydrogel contact lenses obtained by the same processes except of eliminating the reciprocating lowering and raising motion in step e).

According to the present invention, polymerizable lens forming material can be composition comprises (a) at least silicone-containing polymerizable component which is at least one siloxane-containing vinylic monomer, at least one silicone-containing vinylic macromer, or a combination thereof, (b) at least one vinylic crosslinking agent, (c) a blending vinylic monomer selected from the group consisting of a $C_1$-$C_{10}$ alkyl methacrylate, isobornylmethacrylate, isobornylacrylate, cyclopentylmethacrylate, cyclopentylacrylate, cyclohexylmethacrylate, cyclohexylacrylate, styrene, 2,4,6-trimethylstyrene (TMS), and t-butyl styrene (TBS), (d) from about 30% to about 60% by weight of at least one N-vinyl amide monomer relative to the total amount of polymerizable components, and (e) at least one initiator;

Any suitable siloxane-containing vinylic monomers can be used in the invention. Examples of preferred siloxane-containing vinylic monomers include without limitation polycarbosiloxane vinylic monomers (or carbosiloxane vinylic mnomers). A class of preferred siloxane-containing vinylic monomers is polysiloxane-containing vinylic monomers or macromers. Examples of such polysiloxane-containing vinylic monomers are monomethacrylated or monoacrylated polydimethylsiloxanes of various molecular weight (e.g., mono-3-methacryloxypropyl terminated, mono-butyl terminated polydimethylsiloxane or mono-(3-methacryloxy-2-hydroxypropyloxy)propyl terminated, mono-butyl terminated polydimethylsiloxane), or combinations thereof.

A class of preferred silicone-containing macromers is polysiloxane-containing macromers. Examples of such polysiloxane-containing macromers are dimethacrylated or diacrylated polydimethylsiloxanes of various molecular weight; vinyl carbonate-terminated polydimethylsiloxanes; vinyl carbamate-terminated polydimethylsiloxane; vinyl terminated polydimethylsiloxanes of various molecular weight; methacrylamide-terminated polydimethylsiloxanes; acrylamide-terminated polydimethylsiloxanes; acrylate-terminated polydimethylsiloxanes; methacrylate-terminated polydimethylsiloxanes; bis-3-methacryloxy-2-hydroxypropyloxypropyl polydimethylsiloxane; N, N, N',N'-tetrakis(3-methacryloxy-2-hydroxypropyl)-alpha,omega-bis-3-aminopropyl-polydimethylsiloxane; polysiloxanylalkyl (meth)acrylic monomers; siloxane-containing macromer selected from the group consisting of Macromer A, Macromer B, Macromer C, and Macromer D described in U.S. Pat. No. 5,760,100 (herein incorporated by reference in its entirety); the reaction products of glycidyl methacrylate with amino-functional polydimethylsiloxanes; hydroxyl-functionalized siloxane-containing vinylic monomers or macromers; polysiloxane-containing macromers.

Suitable monofunctional hydroxyl-functionalized siloxane-containing vinylic monomers/macromers and suitable multifunctional hydroxyl-functionalized siloxane-containing vinylic monomers/macromers are commercially available from Gelest, Inc, Morrisville, Pa.

Another class of preferred silicone-containing vinylic macromers is silicon-containing prepolymers comprising hydrophilic segments and hydrophobic segments. Any suitable of silicone-containing prepolymers with hydrophilic segments and hydrophobic segments can be used in the invention. Examples of such silicone-containing prepolymers include those described in commonly-owned U.S. Pat. Nos. 6,039,913, 7,091,283, 7,268,189, 7,238,750, 7,521,519, 8,003,710, 8,071,658, 8,071,703, 8,383,744, 8,404,783, 8,524,800, and 8,642,712 (all of which are incorporated herein by references in their entireties.

In addition to N-vinylpyrrolidone, a lens formulation for making SiHy contact lenses of the invention can further comprise one or more hydrophilic vinylic monomers other than N-vinylpyrrolidone. Preferred examples of such hydrophilic vinylic monomers are N,N-dimethylacrylamide (DMA), N,N-dimethylmethacrylamide (DMMA), 2-acrylamidoglycolic acid, 3-acryloylamino-1-propanol, N-hydroxyethyl acrylamide, N-hydroxyethyl methacrylamide, N-hydroxypropyl acrylamide, N-hydroxypropyl methacrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, 2-hydroxyethylmethacrylate (HEMA), 2-hydroxyethyl acrylate (HEA), hydroxypropyl acrylate, hydroxypropyl methacrylate (HPMA), methoxyethylmethacrylate (i.e., ethylene glycol methyl ether methacrylate, EGMA), methoxyethylacrylate, trimethylammonium 2-hydroxy propylmethacrylate hydrochloride, aminopropyl methacrylate hydrochloride, dimethylaminoethyl methacrylate (DMAEMA), glycerol methacrylate (GMA), a $C_1$-$C_4$-alkoxy polyethylene glycol (meth)acrylate having a number average molecular weight of up to 1500, methacrylic acid, allyl alcohol, and mixtures thereof.

Examples of preferred blending vinylic monomers include $C_1$-$C_{10}$ alkyl (meth)acrylate (e.g., methyl (meth)acrylate, ethyl (meth)acrylate, propyl (meth)acrylate, isopropyl (meth)acrylate, 2-ethylhexyl (meth)acrylate, pentyl (meth)acrylate, hexyl (meth)acrylate, etc.), cyclopentylacrylate, cyclohexylmethacrylate, cyclohexylacrylate, isobornyl (meth)acrylate, styrene, 4,6-trimethylstyrene (TMS), t-butyl styrene (TBS), trifluoroethyl (meth)acrylate, hexafluoro-isopropyl (meth)acrylate, hexafluorobutyl (meth)acrylate, or combinations thereof. Preferably, methyl methacrylate or styrene is used as a blending vinylic monomer.

Examples of preferred vinylic cross-linking agents include without limitation tetra(ethyleneglycol) di-(meth)acrylate, tri(ethyleneglycol) di-(meth)acrylate, ethyleneglycol di-(meth)acrylate, di(ethyleneglycol) di-(meth)acrylate, methylenebisacrylamide, triallyl isocyanurate, or triallyl cyanurate. The amount of a cross-linking agent used is expressed in the weight content with respect to the total polymer and is preferably in the range from about 0.05% to about 3%, and more preferably in the range from about 0.1% to about 2%.

Examples of hydrophilic prepolymers with multiple acryloyl or methacryloyl groups include, but are not limited to, a water-soluble crosslinkable poly(vinyl alcohol) prepolymer; a water-soluble vinyl group-terminated polyurethane prepolymer; derivatives of a polyvinyl alcohol, polyethyleneimine or polyvinylamine; a water-soluble crosslinkable polyurea prepolymer; crosslinkable polyacrylamide; crosslinkable statistical copolymers of vinyl lactam, MMA and a comonomer; crosslinkable copolymers of vinyl lactam, vinyl acetate and vinyl alcohol; polyether-polyester copolymers with crosslinkable side chains; branched polyalkylene glycol-urethane prepolymers; polyalkylene glycol-tetra(meth)acrylate prepolymers; and crosslinkable polyallylamine gluconolactone prepolymers.

A polymerizavle composition can also comprise other necessary components known to a person skilled in the art, such as, for example, a UV-absorbing agent (i.e., UV-absorbing vinylic monomers), a visibility tinting agent (e.g., dyes, pigments, or mixtures thereof), antimicrobial agents (e.g., preferably silver nanoparticles), a bioactive agent, leachable lubricants, leachable tear-stabilizing agents, and mixtures thereof, as known to a person skilled in the art.

Examples of suitable thermal initiators include, but are not limited to, 2,2'-azobis (2,4-dimethylpentanenitrile), 2,2'-azobis (2-methylpropanenitrile), 2,2'-azobis (2-methylbutanenitrile), peroxides such as benzoyl peroxide, and the like. Preferably, the thermal initiator is 2,2'-azobis(isobutyronitrile) (AIBN).

Suitable photoinitiators are Darocur 1173® and Darocur 2959®, Germane-based Norrish Type I photoinitiators. Examples of benzoylphosphine initiators include 2,4,6-trimethylbenzoyldiphenylophosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. The polymerization can then be triggered off by actinic radiation, for example light, in particular UV light of a suitable wavelength. The spectral requirements can be controlled accordingly, if appropriate, by addition of suitable photosensitizers.

Where a vinylic monomer capable of absorbing ultraviolet radiation and high energy violet light (HEVL) is used in the invention, a Germane-based Norrish Type I photoinitiator and a light source including a light in the region of about 400 to about 550 nm are preferably used to initiate a free-radical polymerization.

In accordance with the invention, the polymerizable lens forming material can be introduced (dispensed) into a cavity formed by a mold according to any known methods.

After the polymerizable lens forming material is dispensed into the mold, it is polymerized to produce a contact lens. Crosslinking may be initiated thermally or actinically to crosslink the polymerizable components in the polymerizable composition.

Opening of the mold so that the molded article can be removed from the mold may take place in a manner known per se. In accordance with the invention, the molded contact lens which are hold in extraction trays is subject to at least two stages extraction as described below:

a) extracting the formed silicone hydrogel contact lenses with a first extracting medium, wherein the first extracting medium is a first solvent or a mixture of the first solvent and water, b) draining the first extracting medium out of the process tank, c) refilling the process tank with a 100% water According to the present invention, the extracting medium can be any kinds of solvent, including water or mixture of solvents. Example of preferred solvents includes without limitation, water, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimetyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methyl pyrrolidinone, and mixtures thereof Example of more preferred solvents includes water, methanol, ethanol, propanol or isopropanol (preferably in isopropanol).

The lenses are then extracted for a period of time sufficient to remove unpolymerized components (for example, from several minutes to several hours, e.g., 2-4 hours in each extraction stage. The lenses after extraction are hydrated in water, then packaged in phosphate buffered saline, and finally autoclaved.

The invention is partly based on the discovery of a single tank extraction process can be developed to produce optical defect free contact lenses. As mentioned above, the molded contact lens which are hold in extraction trays is typically subject to at least two stages extraction. The invention finds out that the two stages extraction can be carried as follow:

a) extracting the formed silicone hydrogel contact lenses with a first extracting medium, wherein the first extracting medium is a first solvent or a mixture of the first solvent and water, b) draining the first extracting medium out of the process tank, c) refilling the process tank with a 100% water.

Figure 3:
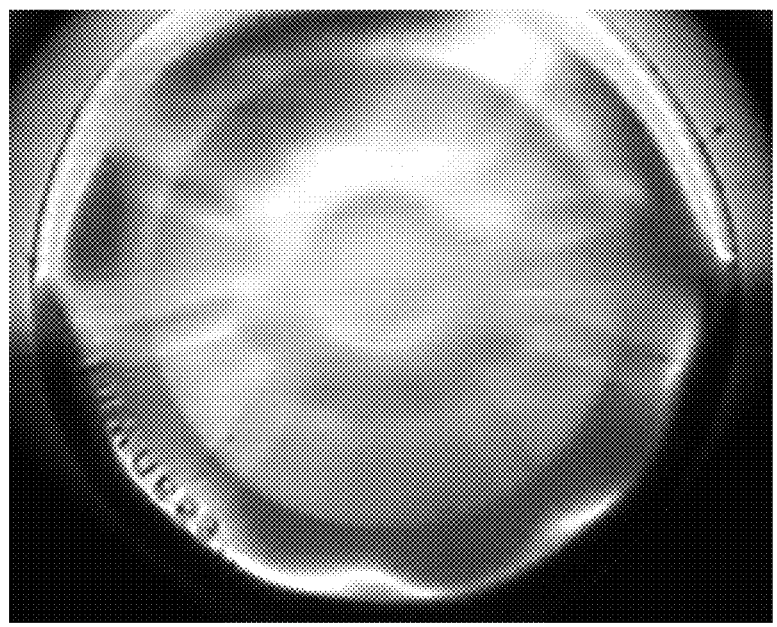
FIG. 3 illustrates a typical tray mark according to the present invention.
Figure 4:
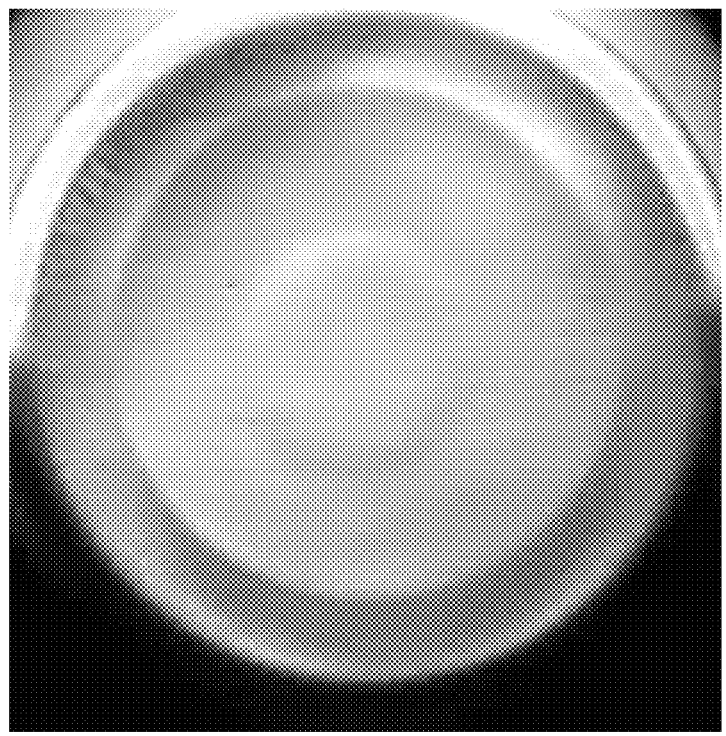
FIG. 4 illustrates a typical dimple (partial tray mark) according to the present invention.

The invention is also partly based on the discovery that the silicone hydrogel contact lenses processed through the single tank extraction process show optical defect, i.e. tray marks (as illustrated in FIG. 3) or dimples (as illustrated in FIG. 4). In FIG. 1, the extraction tray plate (01) contains 48 individual trays (02). Each individual tray holds a contact lens for extracting. The individual tray comprises a plurality of ribs (201) extending from a hub (202) to form a spoke-like configuration to minimize flow restriction for the treatment. Through-hole (203) are cut in the center of the hub, which is also center of first member of the individual tray. The ribs support a contact lens accommodated in the individual tray.

The invention is still partly based on the discovery that the optical defect (tray marks or dimples can be reduced significantly or avoided, if the extraction tray for the formed silicone hydrogel contact lenses is subjected to a reciprocating lowering and raising motion during refilling the process tank with a 100% water.

The applicants believe, without bound by the theory, the root cause of the dimple was detected via a series of studies. In the single tank extraction system the draining process settles lens into tray and creates slight adherence between lens and lower tray with 100% solvent (for example, 1-propanol) or a mixture of solvent and water. When slow filling water (for example UPVV) from the bottom of process tank, the level of water (for example UPVV) rises slowly. The filling rate is not enough to separate lens from ribs or hub of individual extraction tray and meanwhile the surface of lens contacts with water (for example UPVV) partially. Therefore the area where lens contacts water first shrinks first. The area where lens surface adheres to ribs or hub of individual extraction tray or the lens surface hasn't contacted with water yet is still in the shape when lens in 100% solvent or a mixture of solvent and water. This differential shrinkage of lens causes lens distortion. The distortion is not reversible, even after autoclave the dimple structures are still exist. The distortion appears as a tray mark (as illustrated in FIG. 3) or a dimple (partial tray mark as illustrated in FIG. 4)) according to how much the lens adheres to the lower tray and how slow the filling rate is. The lower the filling rate is, the severer the distortion is. It is interesting to find out that the optical defect (tray mark or dimples) can be significantly reduced (at least 85%) or avoided, if the extraction tray for the formed silicone hydrogel contact lenses is subjected to a reciprocating lowering and raising motion during refilling the process tank with 100% water. The reciprocating lowering and raising motions will separate lens from tray and therefore avoid the differential shrinkage problem. A person skilled in the art would know to design the reciprocating lowering and raising motions, for example, using cam and follower system, connecting the tray plate with a follower. As a cam rotates, the tray plate connecting with the follower is raised and lowered, converting rotary motion to reciprocating (back and forth) motion.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Example 1

Lens Optical Defect Determination

A Contact Lens Optical Quality Analyzer (CLOQA) is developed to determine optical distortions caused by surface deformations and other defects in the contact lens, based on the principle of the Foucault knife-edge test. A person skilled in the art understands how to select, align and arrange various optics elements to create collimating light, to illuminate a contact lens, and to capture an image with a device (for example, such as, a CCD camera). The test involves illuminating the contact lens with a near-collimated light, placing a Foucault knife edge near the focal point, moving the knife-edge to block off most of the focused light, and capturing the image of contact lens with a device, for example CCD camera behind the Foucault knife edge. Where there is no optical distortion in the contact lens, all light rays passing through the contact lens come to focus at the knife edge and most of the well-focused light will be blocked off. For areas outside the optical zone which has no focusing function, the knife-edge will block the light from half of the lens to make it dark, while the other half appear bright. If the contact lens has no optical distortions in its optical zone, the whole optical zone will be uniformly dark or bright depending on how much light is blocked by the knife-edge. Where there are optical distortions on the contact lens, light passing through such areas in general does not fall into the main focus and may be either blocked by the knife edge (appearing dark) or pass through freely (appearing bright). The level of contrast not only depends on the amplitude of the distortion, but also depends on the fine position of the knife-edge. The defective areas appear as contrast features in the CLOQA image. The knife-edge test with CLOQA is designed as a qualitative testing device for optical distortions in the optical zone.

Lens optical defect is carried out as follows. The extracted contact lenses are used in the study. Images of the contact lenses are taken with the CLOQA. The optical defect study allows to determine whether the appearance of the tray mark or/and dimple (partial tray mark) on the contact lens.

Example 2

Chemicals

The following abbreviations are used in the following examples: NVP represents N-vinylpyrrolidone; DMA represents N,N-dimethylacrylamide; MMA represents methyl methacrylate; TEGDMA represent triethyleneglycol dimethacrylate; VAZO 64 represents 2,2'-di methyl-2,2'azodipropiononitrile; Nobloc is 2-[3-(2H-Benzotriazol-2-yl)-4-hydroxyphenyl]ethyl methacrylate from Aldrich; TAA represents tert-amyl alcohol; PrOH represents 1-propanol; IPA represents isopropanol; DC 1173 represents Darocur 1173® photoinitiator; PBS represents a phosphate-buffered saline which has a pH of 7.2±0.2 at 25° C. and contains about 0.044 wt. % $NaH_2PO_4.H_2O$, about 0.388 wt. % $Na_2HPO_4.2H_2O$, and about 0.79 wt. % NaCl and; wt. % represents weight percent; D9 represents monobutyl-terminated monomethacryloxypropyl-terminated polydimethylsiloxane (Mw~984 g/mol from Shin-Etsu); CEPDMS represents a di-methacrylate-terminated chain-extended polydimethylsiloxane (Mn 9000 g/mol), which has three polydimethylsiloxane (PDMS) segments linked via diurethane linkages between two PDMS segments and two urethane linkages each located between one terminal methacrylate group and one PDMS segment, is prepared according to method similar to what described in Example 2 of U.S. Pat. No. 8,529,057; "G4" macromer represents a di-methacryloyloxypropyl-terminated polysiloxane (Mn~13.5K g/mol, OH content~1.8 meq/g) of formula (A).

Example 3

A lens formulation is purged with nitrogen at room temperature for 30 to 35 minutes. The $N_2$-purged lens formulation is introduced into polypropylene molds and thermally cured in an oven under the following curing conditions: ramping from room temperature to a first temperature and then holding at the first temperature for a first curing time period; ramping from the first temperature to a second temperature and holding at the second temperature for a second curing time period; optionally ramping from the second temperature to a third temperature and holding at the third temperature for a third curing time period; and optionally ramping from the third temperature to a fourth temperature and holding at the fourth temperature for a fourth curing time period.

Lens molds are opened by using a demolding machine with a push pin. Lenses are pushed onto base curve molds with a push pin and then molds are separated into base curve mold halves and front curve mold halves. The base curve mold halves with a lens thereon are placed in an ultrasonic device (e.g., Dukane's single horn ultrasonic device). Wtih a certain energe force, a dry state lens is relased from mold. The dry state lens is loaded in a designed extraction tray. Alternatively, lenses can be removed from the base curve mold halves by floating off (i.e., soaking in an organic solvent, e.g., IPA, without ultrasonic). The lenses removed from the molds are subjected to an extraction process using water or an organic solvent or a mixture of solvents for at least 30 minutes. For example, extracted in 50% IPA for 30 min, or in 100% IPA for 15 min then back to 50% IPA for 30 min, DI water for 30 min and finally in PBS saline overnight. Inspected lens is packaged in lens packages containing a phosphate buffered saline (pH~7.2) and autoclaved at 121° C. for about 30-45 minutes.

Example 4

A lens formulation is purged with nitrogen at room temperature for 30 to 35 minutes. The $N_2$-purged lens formulation is introduced into polypropylene molds and cured by UV/visible light (Hamamatsu lamp) for a curing time period. The post cast molding procedures described in Example 2 are used in this process for producing SiHy contact lenses.

Examples 5

Lens formulations (fluid polymerizable compositions) are prepared to have compositions (in weight part units). All the

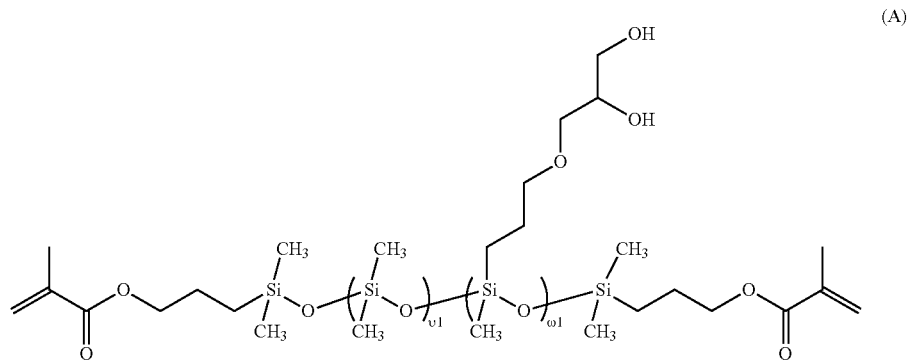

(A)

prepared formulations consists two parts: 102.06 weight part units of the polymerizable materials (0.65 weight part units of TEGDMA, 10 weight part units of G4, 33 weight part units of D9, 46 weight part units of NVP, 10 weight part units of MMA, 1.5 weight part units of Nobloc, 0.40 weight part units of UV28, 0.01 weight part units of RB247, 0.5 weight part units of V64) and various weight part units of an alcohol as shown in Tables 1 to 5. The formulations are prepared by adding listed components in their targeted amounts into a clean bottle, with a stir bar to mix at 600 rpm for 30 minutes at room temperature. After all the solid is dissolved, a filtration of the formulation is carried out by using 2.7 μm glass-microfiber-filter.

Example 6

Extraction Study

Figure 2:
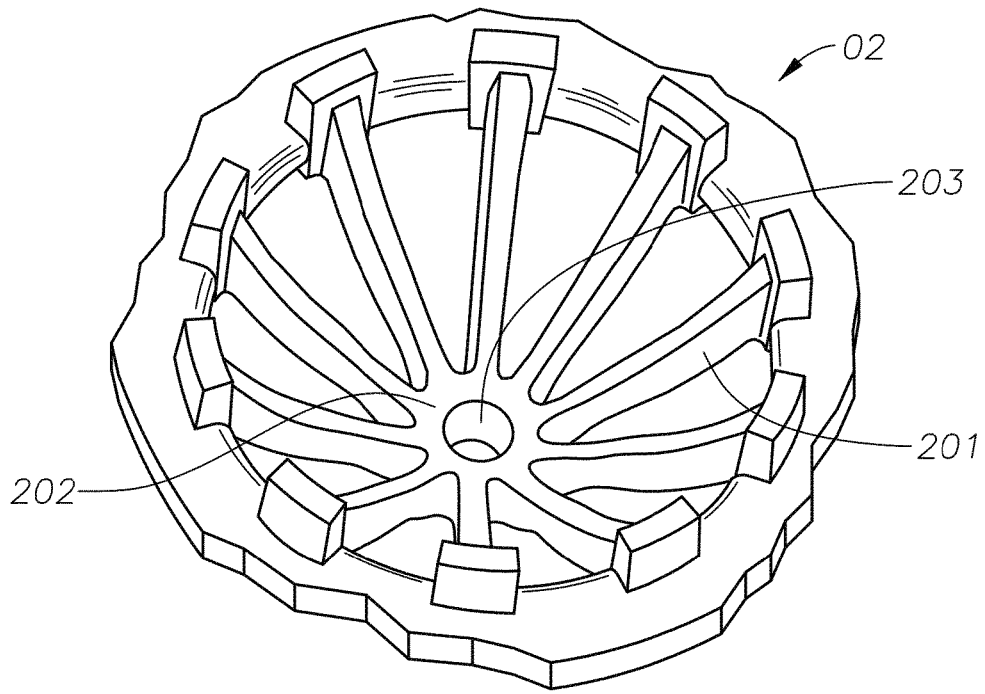
FIG. 2 illustrates an individual extraction tray according to the present invention.

The obtained silicone hydrogel (SiHy) contact lenses are subjected to the following post-molding processes before lens characterization. After demolding, SiHy lenses prepared above are extracted with the following five steps:

1) Formed lenses are placed in 6×8 polypropylene extraction tray plate (as illustrated in FIG. 1) which contain 48 individual trays (as illustrated in FIG. 2). The extraction tray plates are designed as dense packing trays, which means the trays can be stacked one by one. Upper trays serve as the cover of lower trays. The very top tray is empty without lenses. The stack of extraction trays are soaked in 1-propanol for 30 min;

2) Extraction trays with contact lenses are in fresh 1-propanol for another 150 min;

3) Extraction trays with contact lenses are in 50/50 1-propanol/UPW (ultrapure water) for 30 min;

4) Extraction trays with contact lenses are in UPW for 15 min;

5) Extraction trays with contact lenses are in fresh UPW for another 15 min;

The extraction system includes 7 tanks: one 50 L process tank, two 40 L media tanks for storing 50/50 1-propanol/UPW, two 100 L media tanks for storing 1-propanol and UPW, one 100 L waste tank for storing waste water and one 200 L tank for storing waste 1-propanol.

The five steps of extraction process occur in the single process tank. The solution or solvent change between each step by draining used solution or solvent into the waste tanks and then filling fresh solution or solvent from media tanks. In order to equilibrate liquid and eliminate the lenses sticking on extraction tray, agitation is applied during 4) extraction stage 4) extraction trays with contact lenses are in UPW for 15 min or during each extraction step. During filling and draining process the extraction trays are always staying in process tank. The lenses contact with filling solution or solvent gradually and partially.

For single process tank system, adding agitation (a reciprocating lowering and raising motion) during filling UPW process can reduce tray marks and/or dimples (partial tray mark) by at least 80% (significantly) observed using a control Contact Lens Optical Quality Analyze, relative to control silicone hydrogel contact lenses obtained by the same processes except of eliminating the reciprocating lowering and raising motion during refilling water in the 4) step. If the agitation is applied during each extraction step, the silicone hydrogel contact lenses are found optical defect free.

What is claimed is:

1. A method for producing silicone hydrogel contact lenses with significantly reduced optical defect comprising the steps of:
   (1) introducing a polymerizable lens-forming material into a lens mold, wherein the lens-forming material is a silicone hydrogel lens-forming material,
   (2) curing thermally or actinically the polymerizable lens-forming material in the lens mold to form a silicone hydrogel contact lens;
   (3) extracting the formed silicone hydrogel contact lenses which are hold in extraction trays by at least two extracting stages in a single process tank, wherein the extracting step comprises the following steps:
      a) extracting the formed silicone hydrogel contact lenses with a first extracting medium, wherein the first extracting medium is a first solvent or a mixture of the first solvent and water,
      b) draining the first extracting medium out of the process tank,
      c) refilling the process tank with a 100% water, wherein during refilling the process tank, subjecting the extraction tray for the formed silicone hydrogel contact lenses to a reciprocating lowering and raising motion thereof to obtain the silicone hydrogel contact lenses,
   wherein the silicone hydrogel contact lenses have reduced tray marks and/or dimples observed using a contact lens optical quality analyzer, relative to control silicone hydrogel contact lenses obtained by the same processes except for eliminating the reciprocating lowering and raising motion in step c).

2. The method of claim 1, wherein the silicone hydrogel lens-forming material comprises (a) at least silicone-containing polymerizable component which is at least one siloxane-containing vinylic monomer, at least one silicone-containing vinylic macromer, or a combination thereof, (b) at least one vinylic crosslinking agent, (c) a blending vinylic monomer selected from the group consisting of a C1-C10 alkyl methacrylate, isobornylmethacrylate, isobornylacrylate, cyclopentylmethacrylate, cyclopentylacrylate, cyclohexylmethacrylate, cyclohexylacrylate, styrene, 2,4,6-trimethylstyrene (TMS), and t-butyl styrene (TBS), (d) from about 30% to about 60% by weight of at least one N-vinyl amide monomer relative to the total amount of polymerizable components, and (e) at least one initiator.

3. The method of claim 1, wherein the silicone hydrogel lens-forming material comprises from about 35% to about 56% by weight of N-vinylpyrrolidone relative to the total amount of polymerizable components, wherein the polymerizable composition is a solution of all desirable components dissolved in propylene glycol or a polyethylene glycol having a molecular weight of about 400 Daltons or less.

4. The method of claim 1, wherein the blending vinylic monomer is a $C_1$-$C_{10}$ alkyl (meth)acrylate, cyclopentylacrylate, cyclohexylmethacrylate, cyclohexylacrylate, isobornyl (meth)acrylate, styrene, 4,6-trimethylstyrene (TMS), t-butyl styrene (TBS), trifluoroethyl (meth)acrylate, hexafluoroisopropyl (meth)acrylate, hexafluorobutyl (meth)acrylate, or combinations thereof.

5. The method of claim 4, wherein the step of curing is carried out thermally for a time period of at least about 60 minutes, wherein the polymerizable composition comprises at least one thermal free-radical initiator.

6. The method of claim 4, wherein the step of curing is carried out by UV/visible irradiation, wherein the polymerizable composition comprises at least one free-radical photoinitiator.

7. The method of claim 2, wherein the first extracting medium is 1-propanol.

* * * * *